UNITED STATES PATENT OFFICE.

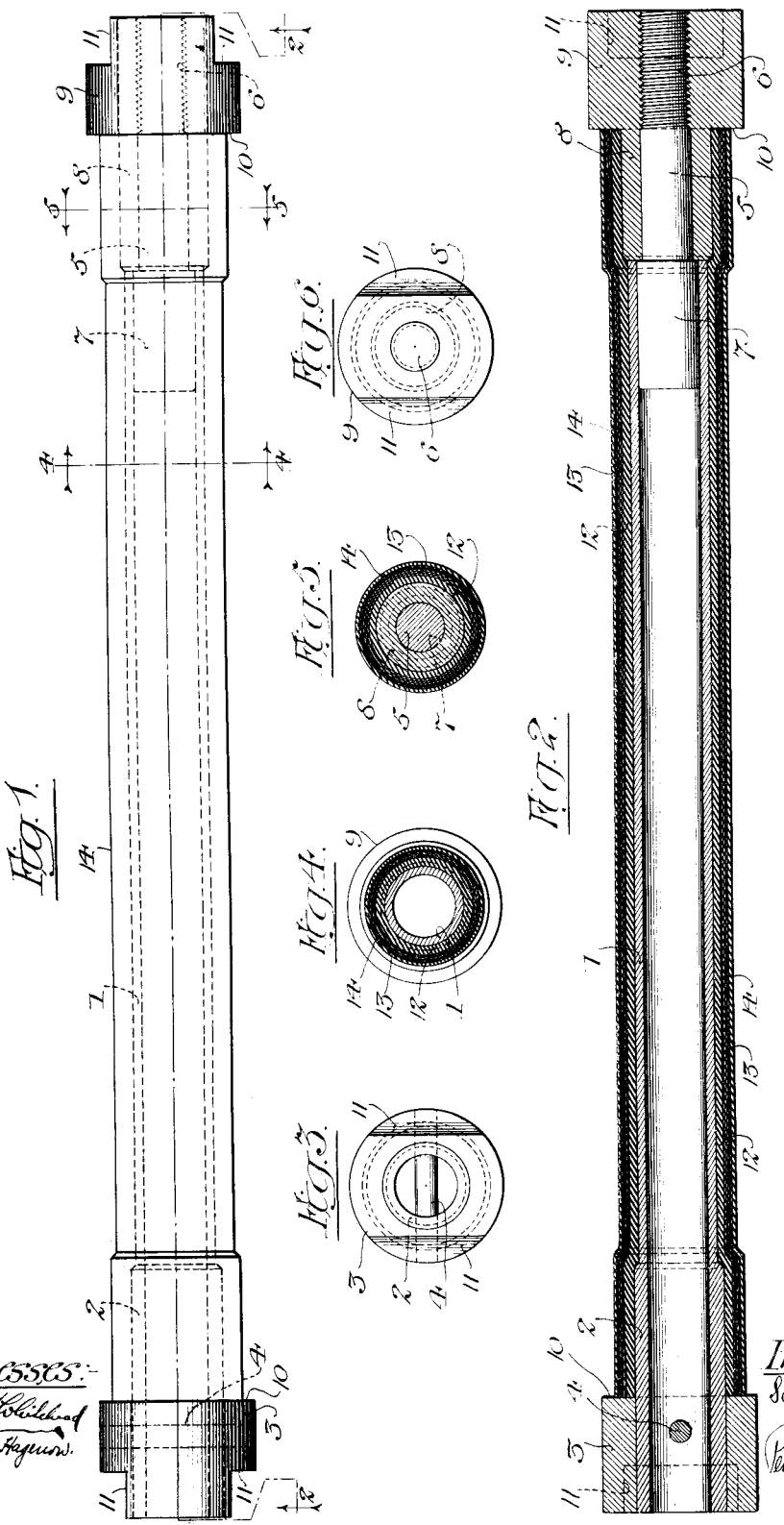

SAMUEL J. SILL, OF BUFFALO, NEW YORK, ASSIGNOR OF ONE-HALF TO HERBERT H. HEWITT, OF BUFFALO, NEW YORK.

MANDREL FOR FORMING AND VULCANIZING RUBBER HOSE.

1,130,030.  Specification of Letters Patent.  Patented Mar. 2, 1915.

Application filed January 2, 1913. Serial No. 739,878.

*To all whom it may concern:*

Be it known that I, SAMUEL J. SILL, a citizen of the United States, and a resident of Buffalo, county of Erie, and State of New York, have invented certain new and useful Improvements in Mandrels for Forming and Vulcanizing Rubber Hose, of which the following is a full, clear, and exact description.

The invention relates to mandrels whereon short lengths of rubber hose, such as are employed in railway air-brake systems, are formed and vulcanized. Such rubber hose is connected at its ends to metal couplings, the nipples of which are inserted in enlarged ends of the hose. Usually the ends of the hose are enlarged after the hose has been formed. This practice of enlarging the end portions of the hose after it has been constructed tends to weaken the hose at its ends and at the portions thereof which are necessarily subjected to the greatest amount of wear.

The present invention seeks to provide an improved mandrel upon which the lengths of hose are formed and vulcanized and which provides the lengths of hose with enlarged ends during the process of manufacture, and which will also provide the desired square finish to the end faces of the hose.

The improvement consists in the features of construction hereinafter set forth, illustrated in the preferred form in the accompanying drawings, and more particularly pointed out in the appended claims.

In the drawings,—Figure 1 is an elevation of the improved mandrel with a hose section thereon; Fig. 2 is a longitudinal section thereof taken on the line 2—2 of Fig. 1; Fig. 3 is a view of the left-hand end of the mandrel; Figs. 4 and 5 are cross sections on the lines 4—4 and 5—5, respectively, of Fig. 1; and Fig. 6 is a view of the right-hand end of the mandrel.

The body 1 of the improved mandrel is formed of iron or steel, and is preferably hollow to reduce its weight. At one end it is provided with a slightly enlarged portion 2. The mandrel is conveniently formed from a piece of wrought-iron or steel pipe, which is turned to form the enlarged portion 2 and the reduced body 1 thereof. A terminal collar 3 is fitted over the end of the enlarged portion 2, and is fixed in position by a cross pin 4, or in any other suitable manner.

At its opposite end the mandrel is provided with an axially projecting stem 5 of reduced diameter. The outer end of the stem is provided with a threaded portion 6 slightly reduced in diameter, and, at its inner end, the stem is provided with an enlarged head or plug 7 which fits within the adjacent end of the hollow mandrel and is firmly secured thereto in any suitable manner. A sleeve 8 fits over the stem 5 and abuts against the adjacent end of the body portion 1 of the mandrel. The outer end of the bore of the sleeve is threaded to engage the threaded portion 6 of the stem and thereby detachably secure the sleeve in position. The main body portion of the sleeve 8 corresponds in diameter to the enlarged portion 2 at the opposite end of the mandrel, and these parts serve to form the enlarged ends of the hose section.

The sleeve 8 is provided at its outer end with a collar 9, which is preferably integral therewith. This collar is of the same diameter as the collar 3 at the opposite end of the mandrel, and these parts form square shoulders 10 against which the end faces of the hose section are formed. The sides of the collars 3 and 9 adjacent their ends are provided with flattened faces 11, so that these parts may be engaged by suitable chucks, wrenches or like tools for unscrewing the sleeve 8 and collar 9 and for replacing the same in position.

In using the improved mandrel, the sleeve 8 with the collar 9 thereon are removed and a core or tube 12 of raw rubber is slipped over the mandrel. The parts 8 and 9 are then replaced in position. If desired, the core 12 of raw rubber may be formed of a narrow sheet wrapped about the mandrel. This core or tube extends over the body portion 1 of the mandrel and over the enlarged portion 2 thereof, and also over the sleeve 8, the ends of the core abutting against the shoulders 10 of the collars 3 and 9. Layers or plies 13 of suitable fabric are then wrapped about the rubber core 12 on the mandrel. Preferably a sheet of "frictioned" duck is smoothly wrapped about the rubber core 12 in a suitable wrapping machine, in which the mandrel is placed, the duck being drawn snugly over the enlarged portions 2 and 8 and having its side edges snugly engaging the shoulders 10. Thereafter a narrow strip of raw rubber is wrapped upon the fabric 13 to form an outer protecting layer 14, the ends of which abut snugly against the shoulders 10.

After the hose section is formed on the mandrel, as described, it is preferably wrapped with wet cloths and subjected to the vulcanizing or curing process. After vulcanizing, the sleeve 8, with the collar 9 thereon, is removed, preferably by placing the mandrel between a pair of chuck heads which are provided with suitable recesses for receiving the flattened end portions of the collars 3 and 9. One of the chuck heads is then rotated to unscrew and remove the sleeve 8. The finished hose is then removed from the mandrel.

By using the improved mandrel the hose section is provided with enlarged ends during its process of manufacture and before vulcanization, so that it is unnecessary to subsequently enlarge or weaken its ends. The length of the hose is accurately determined by the shoulders 10 of the collars 3 and 9, and these shoulders form square end faces upon the hose section.

It is obvious that changes may be made from the details set forth without departure from the essentials of the invention as defined in the claims.

I claim as my invention:

1. A mandrel for forming rubber hose comprising a cylindrical body having enlarged cylindrical end portions on which said hose is formed and terminal collars forming abutments over the ends of said hose, one enlarged end portion and the adjacent collar being detachable from the body of the mandrel to permit the removal of said hose, substantially as described.

2. A mandrel for forming rubber hose comprising a cylindrical body having an enlarged portion at one end and a reduced stem at its opposite end, and a sleeve corresponding in size to said enlarged portion detachably mounted on said stem, said enlarged portion and said sleeve having terminal collars thereon, substantially as described.

3. A mandrel for forming rubber hose comprising a cylindrical body having an enlarged cylindrical portion at one end and a reduced threaded stem at its opposite end, and a cylindrical sleeve corresponding in size to said enlarged portion threaded on said stem, said enlarged portion and said sleeve having terminal collars thereon and flattened wrench-engaging faces, substantially as described.

SAMUEL J. SILL.

Witnesses:
   Eugene J. Coleman,
   George D. Plumstead.